Sept. 4, 1923.                                           1,467,053
L. MACH
FREEZING MACHINE OF THE ABSORPTION TYPE
Filed Oct. 3, 1922
Fig. 1.
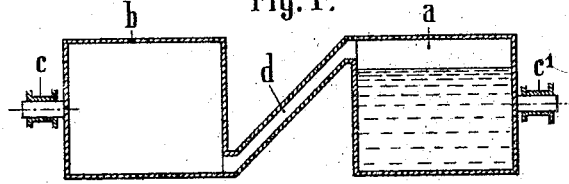
Fig. 2.
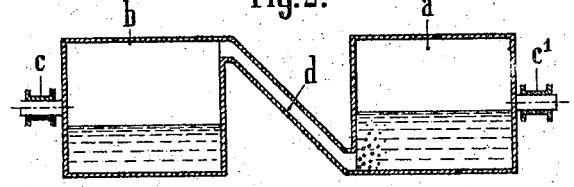
Fig. 3.
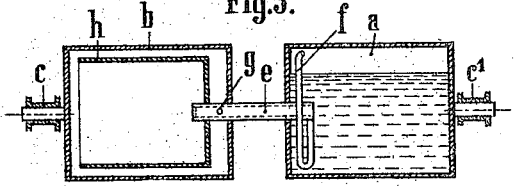
Fig. 4.
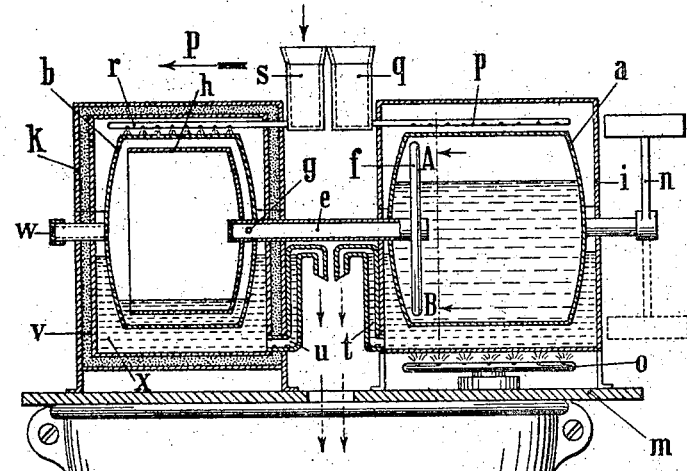
Fig. 5. (A–B)
Fig. 6.
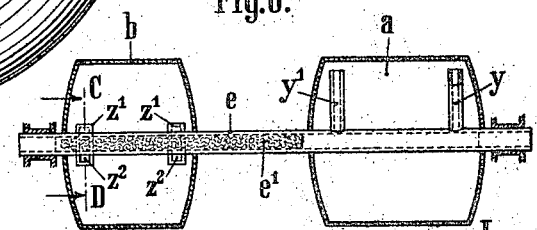
Fig. 7. (C–D)
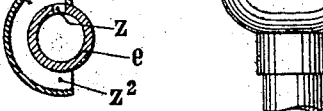
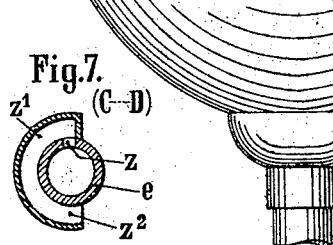
Inventor:
Ludwig Mach
By ........ Attorney.

Patented Sept. 4, 1923.

1,467,053

UNITED STATES PATENT OFFICE.

LUDWIG MACH, OF MUNICH, GERMANY.

FREEZING MACHINE OF THE ABSORPTION TYPE.

Application filed October 3, 1922. Serial No. 592,016.

*To all whom it may concern:*

Be it known that I, LUDWIG MACH, a citizen of Czechoslovakia, residing at Munich, Bavaria, Germany, have invented certain new and useful Improvements in a Freezing Machine of the Absorption Type, of which the following is a specification.

The invention relates to a handy freezing machine of the intermittently acting, reversing absorption type of compact construction in which ice can be quickly and conveniently prepared by means of a solution of a vapourizable medium, for example of an aqueous solution of ammonia.

According to the invention, the vessel (the heater) in which the aqueous solution of ammonia is heated and the vessel (the evaporator) in which the condensation and the re-evaporation of the ammonia take place, are constructed as cylinders and secured to the same axle. After the ammonia has been driven off from the aqueous solution and before the heater is cooled, these vessels are rotated about this axle, for instance through 188°. A tube connects the evaporator and the heater and one end of the tube in the first position (that in which the ammonia vapour is driven off) is above the level of the fluid in the heater and, after the evaporation has been completed and the vessels rotated about the axle, this end is immersed in the water remaining in the heater. If the heater is now cooled the ammonia vapours given off in the evaporator, in consequence of the existing pressure and temperature relations, can again return through the connecting tube into the heater and are readily absorbed by the water remaining therein.

The two vessels are preferably connected by a hollow axle which forms in the heater a tube of straight or arc shape, in a plane perpendicular to the rotary axis. The evaporator is arranged preferably in a container in which there is water, which when the ammonia is driven off from the aqueous solution in the heater, serves for cooling the vapour and which is converted into ice after the rotation of the vessels about their axle during the re-evaporation of the condensate collected in the evaporator. The heater can if required be also placed in a vessel constituting a water bath, which transmits the heat from the source to the heater and protects it from the direct action of the heat source. Both containers can be provided with overflow tubes in order to maintain the water at predetermined levels. It is also preferable to insert a so-called displacing bell in the evaporator by which the vapours coming from the heater into the evaporator are conducted along the inner walls of the heater. Finally, the passage of water from the heater into the evaporator when the ammonia is driven from the aqueous solution is prevented by dash plates such as baffles or the like in the hollow axle between the heater and the evaporator, which separate the water carried over with the ammonia vapour from the latter.

In the accompanying drawings examples of constructions of a freezing machine according to the invention are represented.

Fig. 1 shows diagrammatically the arrangement of a heater and evaporator in the first position before the ammonia is driven from the solution.

Fig. 2 shows the same arrangement after it has been rotated about a horizontal axle and at the commencement of the absorption stage.

Fig. 3 shows in section two containers with their connecting tube.

Fig. 4 shows in section the general arrangement of the freezing machine.

Fig. 5 is a section on the line A—B of Fig. 4 seen in the direction of the arrow.

Fig. 6 shows a modified construction of the two containers with their connecting tube.

Fig. 7 is a detail on a larger scale in section on the line C—D of Fig 6 seen in the direction of the arrow.

Figs. 1 and 2 serve for explaining the principle of the invention.

$a$ is the heater, $b$ the evaporator, which are both formed as cylindrical vessels and are rotatable about a common axle provided with bearings $c$, $c^1$. The vessels $a$ and $b$ are connected by a tube $d$ which in the first position, that is before the ammonia has begun to be driven out of the aqueous solution in $a$, lies as shown in Fig. 1. The tube $d$ opens in the heater $a$ above the level of the liquid, but in the vessel $b$ at its lower part. If heat is conveyed to the heater $a$ the ammonia is driven from the solution and the vapour passes through the tube $d$ to the evaporator $b$. The evaporator is cooled during this time and the condensed ammonia collects on the bottom of $b$. After the process of driving the ammonia from the solution in $a$ has been completed, the heat supply to $a$ is cut off, the cooling of the vessel $b$ ceases and, on the other hand, the heater $a$ begins to cool. At the same time the device is rotated about the common axle in the bearings $c$ and $c^1$, for example through 180°, so that the position shown in Fig. 2 is attained. The condensate in $b$ begins to evaporate and is readily absorbed by the water remaining in the heater $a$. By the evaporation heat is withdrawn from the surroundings of the vessel $b$ and ice is formed externally on its walls.

In Fig. 3 the connecting tube is shown as a hollow axle $e$ which lies in the central axis of the two vessels. A sickle-formed tube $f$ is disposed in the heater on this hollow axis, the form of the tube being shown in Fig. 5 and its open end lying above the level of the fluid in the first position shown in Fig. 3. In the hollow axle within the evaporator $b$ radial holes $g$ are provided through which the vapours conveyed by the tube $f$ arrive into the evaporator $b$. Within the evaporator $b$ there is also the so-called displacement bell $h$ which leads the vapours escaping from the holes $g$ to the inner walls of the vessel $b$.

In Fig. 4 a construction of the machine is represented which can be employed for household purposes. The heater $a$ and the evaporator $b$ are arranged on a common axle and are each placed in separate containers $i$ and $k$ which can be secured together on a plate or the like $m$. $e$ is as before the hollow axle provided with the sickle-shaped tube $f$ and the radial holes $g$. $h$ is the displacement bell in the evaporator $b$. The axles of the two vessels are supported in the containers $i$ and $k$ of which the upper portions are preferably removable. At the end of the axle there is near the container $i$ a crank $n$ by means of which the rotation through 180° can be effected. Below the container $i$ there is a suitable source $o$ of heat. Above the heater there is in the container $i$ a cooling tube $p$ with openings and an inlet $q$ while above the evaporator $b$ there is a cooling tube $r$ with inlet $s$. Water can be admitted into these tubes from a cock shown above the vessels. In the containers $i$ and $k$ overflow tubes $t$ and $u$ are preferably arranged which always maintain a sufficiently high water level in the containers. The container $k$ is preferably provided with an insulated lagging $v$.

Ice can be produced by the arrangement shown in Fig. 4 in the following manner:

After the heater $a$ has been filled with strong aqueous ammonia through a removable cap $w$ on the axle or through a valve or the like and the device has been again closed, heat is conducted to the heater $a$ from the source $o$, while the arrangement is in the position shown in Fig. 4, so that cooling water from the tube $r$ plays on the evaporator $b$. After all the ammonia has been driven off through the tube $f$ and the hollow axle $e$ into the evaporator, the source $o$ of heat is cut off and the arrangement is displaced in the direction of the arrow P so that now cooling water flows from the tube $b$ on to the heater $a$. At the same time the device has been rotated through 180° by the crank $n$, so that the end of the tube $f$ lies below the level of the fluid in $a$ and the vapour set free in $b$ can again return into the fluid in $a$ where it is absorbed. Ice then forms within the container $k$ at $x$ in approximately dish-formed form. The ice blocks can be loosened very easily from the wall of the evaporator if the whole arrangement is tilted, so that liquid flows from the heater into the evaporator $b$, and in consequence of the relatively high temperature of this liquid the ice is thawed off from the walls of the evaporator.

In the arrangement shown in Fig. 6, two tubes $y$ and $y^1$ are disposed on the hollow axle $e$ in the heater $a$ and after the rotation through 180° the open ends of these tubes are below the water level. The vapour is led into the evaporator $b$ from the hollow axle $e$ which has at two places on its upper part in the positions shown an opening $z$ (Fig. 7). Around each opening there is on the axle $e$ a hollow body $z^1$ having the form shown in Fig. 7 which prevents any water carried over with the ammonia vapour during the rotation of the arrangement through 180° from collecting at the bottom of the evaporator $b$. The bodies $z^1$ which are formed as annular segments embracing rather more than a semicircle provide in the position shown in Fig. 7 at $z^2$ an escape for the vapour into the evaporator $b$, while after the rotation through 180° they retain any water carried over which is afterwards pressed back into the hollow axle and thence into the heater $a$ by the pressure then existing in $b$. In order to prevent as far as possible water from being carried over with the ammonia vapours from the heater into the evaporator, the hollow axle $e$ can be filled with little baffles $e^1$ or the like which separate the water from the vapour in consequence of the numerous changes in the direction of flow.

What I claim is:

1. A freezing machine of the intermittently acting, reversing, absorption type, comprising a heater and an evaporator fixed relatively to each other and rotatable about a common axis of rotation passing through said heater and evaporator, and a conduit between the heater and the evaporator, the end of said conduit leading to the heater terminating near the circumferential wall of the said heater.

2. A freezing machine of the intermittently acting, reversing, absorption type, comprising a heater and an evaporator, a hollow axle on which same are rotatably and longitudinally arranged, said axle acting as a conduit therebetween and said conduit projecting at one end into the heater, a tube carried thereby, in communication therewith and terminating near the circumferential wall of the heater, and a centrally arranged displacer member communicating with the hollow axle and arranged within the evaporator to direct the gaseous medium coming from the heater toward the wall of the evaporator.

3. A freezing machine of the intermittently acting, reversing, absorption type, comprising a heater and an evaporator, a hollow axle on which same are rotatably and longitudinally arranged, said axle acting as a conduit therebetween and said conduit projecting at one end into the heater, a tube carried thereby, in communication therewith and terminating near the circumferential wall of the heater, a water container in which the evaporator is arranged, and an overflow device to maintain a predetermined level of the water in said container.

4. A freezing machine of the intermittently acting, reversing, absorption type, comprising a heater and an evaporator, a hollow axle on which same are rotatably and longitudinally arranged, said axle acting as a conduit therebetween and said conduit projecting at one end into the heater, a tube carried thereby, in communication therewith and terminating near the circumferential wall of the heater, a water container in which the evaporator is arranged, a water container in which the heater is arranged, and overflow devices for maintaining the respective levels of water in said containers.

In testimony whereof he has affixed his signature.

LUDWIG MACH.

Witnesses:
ALEXANDER DE SOTO,
ALEXIS PHILIPPOFF.